United States Patent [19]

Hemmis et al.

[11] Patent Number: 5,558,390
[45] Date of Patent: Sep. 24, 1996

[54] REAR-WINDOW PANE FOR CONVERTIBLES

[75] Inventors: Ludger Hemmis; Matthias Overberg, both of Osnabrück; Burkhard Schröder, Sassenberg, all of Germany

[73] Assignee: Wilhelm Karmann GmbH, Osnabrueck, Germany

[21] Appl. No.: 490,260

[22] Filed: Jun. 14, 1995

Related U.S. Application Data

[62] Division of Ser. No. 227,808, Apr. 14, 1994, Pat. No. 5,464,265.

[30] Foreign Application Priority Data

Apr. 29, 1993 [DE] Germany .............................. 9306462 U

[51] Int. Cl.[6] ....................................................... B60J 7/12
[52] U.S. Cl. ..................................... 296/146.14; 296/201
[58] Field of Search ........................... 296/146.14, 96.21, 296/201, 146.15, 146.16, 107

[56]         References Cited

U.S. PATENT DOCUMENTS

| 4,572,570 | 2/1986 | Trucco | 296/107 |
|---|---|---|---|
| 5,061,332 | 10/1991 | Stolz et al. | 296/146.14 X |
| 5,271,655 | 12/1993 | Ball et al. | 296/146.14 |
| 5,320,400 | 6/1994 | Orth et al. | 296/146.14 |

FOREIGN PATENT DOCUMENTS

| 3835292 | 4/1990 | Germany | 296/146.14 |
|---|---|---|---|
| 3841035 | 6/1990 | Germany | 296/146.14 |

*Primary Examiner*—Joseph D. Pape
*Attorney, Agent, or Firm*—Jordan and Hamburg

[57]            ABSTRACT

A rear-window pane of solid glass is insertable in the folding top cover of a convertible. The solid glass pane is provided with a plastic connecting element which is applied on the edge region of the solid glass pane and can be connected with the cover of the folding top by means of high frequency welding. With this arrangement, an additional reinforcing is no longer required and, accordingly, the advantages of a plastic window pane are combined with the longevity and stability of the glass material.

16 Claims, 4 Drawing Sheets

REAR-WINDOW PANE FOR CONVERTIBLES

This is a division of application Ser. No. 08/227,808, filed Apr. 14, 1994, now U.S. Pat. No. 5,464,265.

BACKGROUND OF THE INVENTION

Rear-window panes of solid glass for convertibles are known. However, they require an angle frame to accommodate the material of the folding top and a rubber seal for the glass pane. When the top is folded down, however, only a spatially limited folding down of the folding-top package is possible because of the bulkiness of the angle frame, so that this package stands up relatively high. Therefore, in order to make it possible to fold down the folding top package lower, the use of rear-window panes of a flexible or transparent plastic in convertible tops is known. These have the advantage of not requiring any additional reinforcing measures, such as angle frames or the like, since they can absorb the tensile forces that arise in the material of the folding top when the latter is under tension. However, their stability is only slight. This is a disadvantage because they frequently have to be exchanged prematurely.

SUMMARY OF THE INVENTION

It is, therefore, an object of the present invention to provide a rear-window pane of solid glass, which does not require an additional reinforcing frame and thus combines the advantages of a plastic window pane with the longevity and stability of the material glass. At the same time, the solid glass pane must be constructed so that there is a satisfactory seal with the covering of the folding top.

Due to the inventive combination of a solid glass pane with plastic connecting means, which can be combined with the covering of the folding top by high frequency welding, the use of glass panes in rear windows of convertibles is possible without having to use additional reinforcing frames. The use of glass panes is desirable because they are distinguished by a long service life and a high stability. The tensile forces arising in the stressed state of the cover can be absorbed over the connecting elements and introduced into the glass pane. Since bulky reinforcing frames are not required, the top of the convertible can be folded down far towards the rear. In addition, due to the absence of a reinforcing frame, there is a weight advantage so that when the top is folded back, the rear-window pane pushes through less in the downward direction.

The inventive refinement of the rear-window pane results in yet further advantages. Due to the advantageous construction of the connecting element as an extruded profile, a simultaneous sealing of the connection between the window pane and the folding top cover becomes possible so that rain water cannot penetrate into the vehicle.

Preferably, PVC or TPE is used as the material for the extruded profile, since these materials are distinguished by a high tensile strength and suitable properties in stress behavior so that the tensile forces arising when the folding top is being closed can be absorbed well over the profile.

In a preferred embodiment, a bonding agent such as a lacquer is applied on the outer edge regions of the rear-window pane so that the application of extruded PVC or TPE by an injection method can take place directly afterwards. In a different, advantageous embodiment, the adhesive is applied on the outer regions of the rear-window pane and the profile, previously high frequency welded to the material of the folding top, is placed onto the adhesive. The bonding agent, as well as the adhesive, enable the glass pane to be bonded reliably to the profile and ensure protection against penetration of moisture.

In a preferred embodiment of the rear-window pane, retaining elements for mounting tensile connecting means (tension straps) as well as retaining elements for the rear-window guide are glued to the inner side rear-window pane. Accordingly, the window pane represents an installation unit. By these means, the manufacturing process of folding tops for convertibles can be simplified.

Two embodiments of the object of the invention are described in greater detail in connection with the accompanying drawings.

DESCRIPTION OF THE PREFERRED EMBODIMENTS

Figure 1:
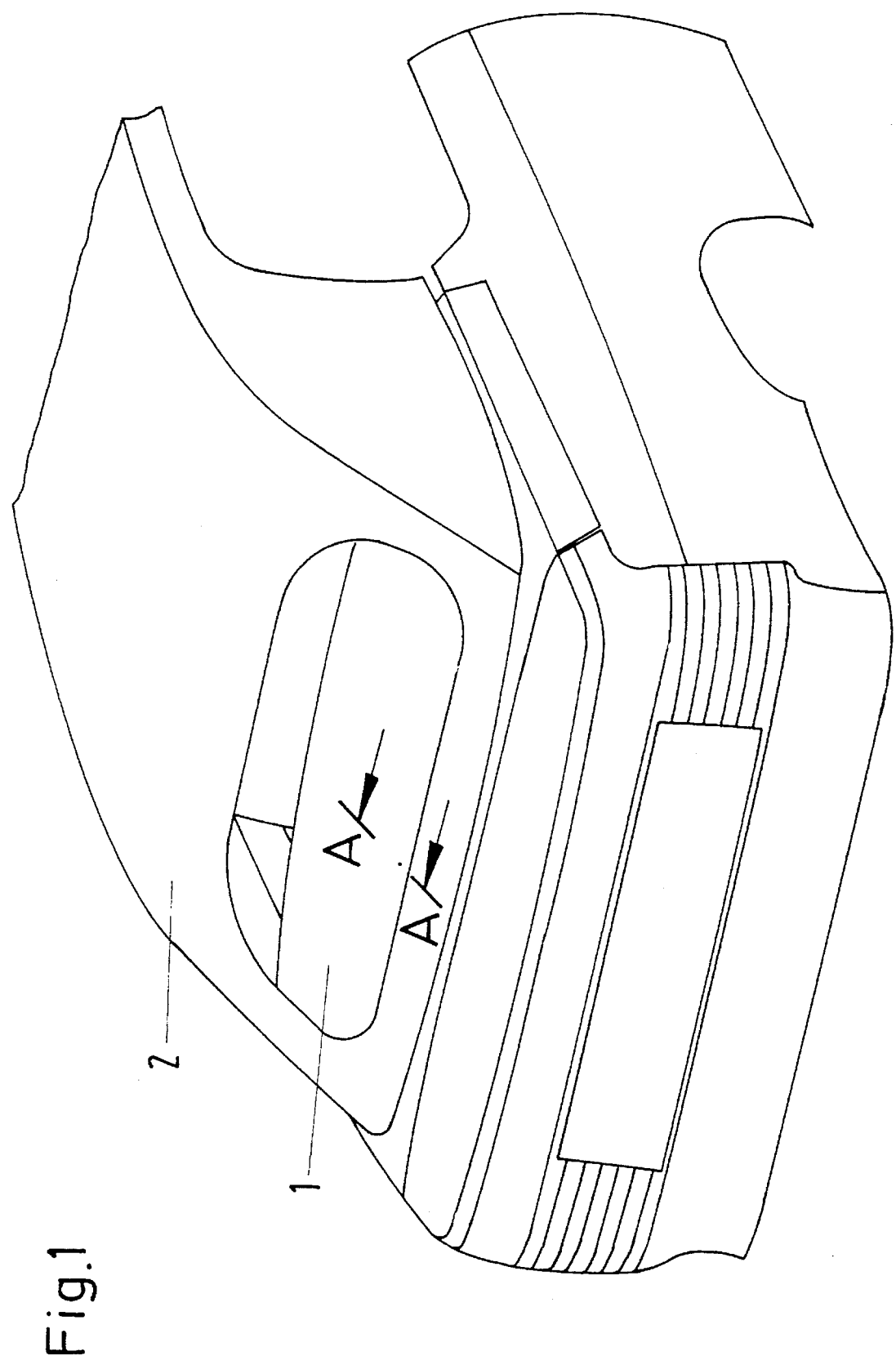
FIG. 1 is a rear view of a vehicle with a convertible top.

Referring to the drawings, FIG. 1 shows a rear-window pane 1 in the top 2 of a convertible.

Figure 2:
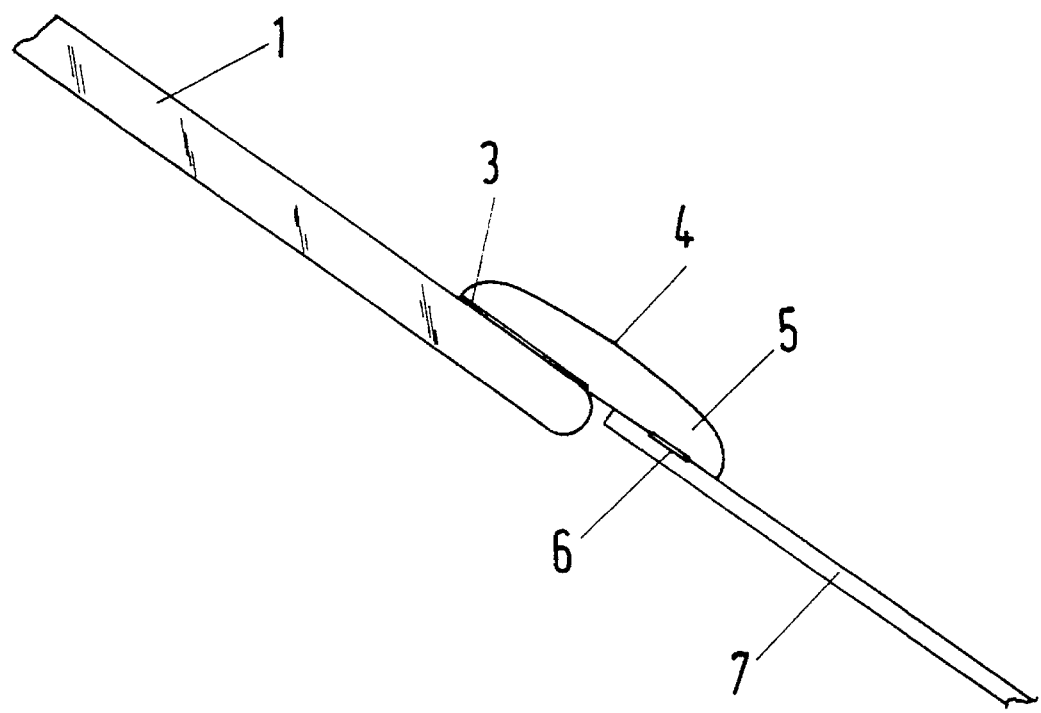
FIG. 2 is a sectional view taken along the line A—A in FIG. 1 showing a first embodiment.

As shown in FIG. 2, which is a first embodiment of the invention, a bonding agent 3, such as lacquer, is applied to the edge region of the rear-window pane 1 consisting of glass. By means of said bonding agent 3, the rear-window pane 1 is connected with an extruded profile 4. The profile 4 consists of an extruded PVC (polyvinyl chloride) or TPE (thermoplastic elastomer with an increased proportion of rubber) and is sprayed onto the bonding agent 3 in an injection method. In this embodiment, the profile 4 protrudes some distance over the edge of the rear-window pane 1. This region 5 of the profile is bonded by high frequency welding 6 with the material 7 of the top of the convertible. The HF welding 6 is carried out along the edge of the window pane 1, so that the vehicle is protected against penetrating moisture. On the other side of the extruded profile 4, the bonding agent 3 acts as seal against moisture. Due to the welded seam 6, the profile 4 and thus the window pane 1 are combined firmly into a unit with the material 7 of the folding top. Additional seals are unnecessary.

Figure 3:
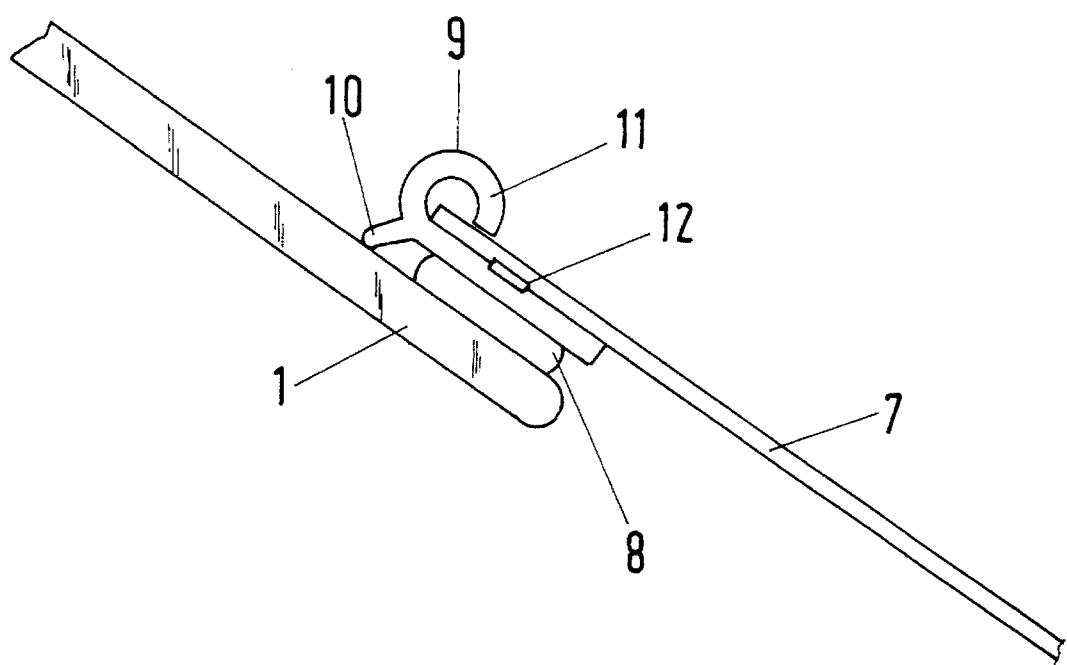
FIG. 3 is a sectional view taken along the line A—A of FIG. 1 showing a second embodiment.

In FIG. 3, which is a second embodiment, there is shown an adhesive 8 which is applied on the outer edge of the rear-window pane 1. On the adhesive 8 applied, there is an extruded profile 9, which is more structured than in the embodiment of FIG. 2 and which has previously been HF welded to the material 7 of the folding top. The extruded profile 9 has a small nose 10, which lies directly against the glass pane 1 and is pushed into a roundness 11 on the material 7 of the folding top. Both swagings represent additional measures for supporting the tightness of the seal against the penetration of moisture between the glass pane 1 and the material 7 of the folding top. As stated above, the profile 9 has previously been combined with the material 7 of the folding top by an HF welded seam 12. In this case, the profile 9 does not protrude beyond the glass pane 1 and the HF welded seam 12 and the adhesive 8, which has been applied, are disposed on top of one another, whereas they are disposed next to one another in FIG. 2. In this embodiment also, the glass pane 1 and the material 7 of the folding top are firmly connected to one another and can be separated from one another only by destruction.

Figure 4:
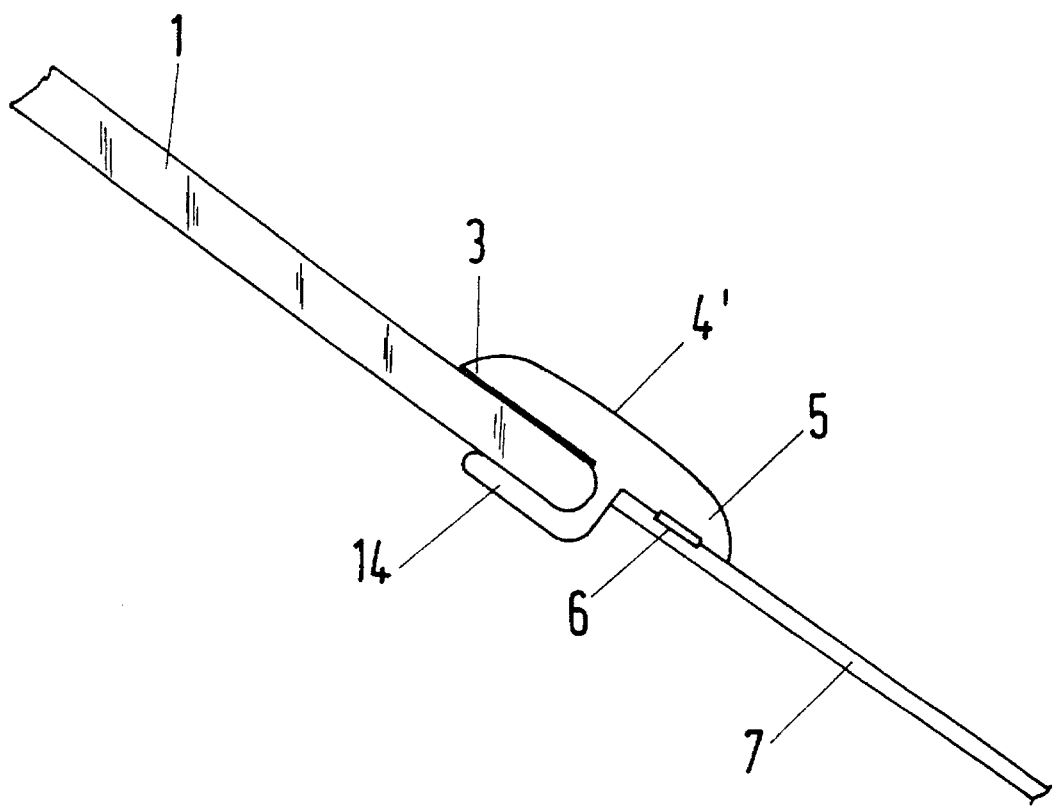
FIG. 4 is a modification of FIG. 2.

The object of the invention is not limited to the embodiments described and other embodiments are also possible within the scope of the claims. For example, as shown in Figure 4, an extruded profile 4' can be provided with a lip 14 which grips around and below the edge of the solid glass pane 1 in order to enable the rear-window pane to be held better.

For the convertible top 7, there are basically two types of materials, on the one hand, a top consisting of PVC and, on the other, one consisting predominantly of textiles. In the case of PVC tops, the use of high frequency (HF) welding usually is possible without any auxiliary materials. On the other hand, when textile tops are HF welded, a welding agent is added which provides the necessary bond between the individual materials. For welding auxiliary, a "Gutakol" tape (named after the manufacturer) may be used which optically can be regarded as equivalent to a transparent film, that is, by means of the above-named welding auxiliary, it is possible, in principle, to weld the material of any top by HF welding to itself or to the profile 4.

The injection method for applying an extruded PVC or TPE profile is one possible method which is illustrated by the variation shown in FIG. 2. The profile 4', shown in FIG. 4, is not applied by an injection method on the rear-window pane as it is in FIG. 2; instead, the desired profile is produced by injecting a composition, also consisting of PVC or TPE, into a mold. The profile thereupon is applied with the help of adhesives on the rear-window pane and subsequently welded with the material of the top.

What is claimed is:

1. The combination comprising a folding convertible top for a vehicle, said folding convertible top having an opening defined by a marginal edge portion, a window pane of solid glass disposed in said opening, said glass having an outer edge section, a plastic extruded profile element extending between said marginal edge portion of said convertible top and said outer edge section of said glass, securing means securing said plastic extruded profile element to said marginal edge portion of said convertible top, and affixing means affixing said plastic extruded profile element to said outer edge section of said glass, whereby said glass is thereby sealingly secured to said convertible top.

2. The combination according to claim 1 wherein said plastic extruded profile element comprises an extruded member made of polyvinyl chloride.

3. The combination according to claim 2 wherein said plastic extruded profile is formed by injecting said polyvinyl chloride into a mold.

4. The combination according to claim 1 wherein said plastic extruded profile element comprises an extruded member made of thermoplastic elastomer.

5. The combination according to claim 4 wherein said plastic extruded profile element is formed by injecting said thermoplastic elastomer into a mold.

6. The combination comprising a folding convertible top for a vehicle, said folding convertible top having an opening defined by a marginal edge portion, a window pane of solid glass disposed in said opening, said glass having an outer edge section, a plastic connecting element extending between said marginal edge portion of said convertible top and said outer edge section of said glass, securing means securing said plastic connecting element to said marginal edge portion of said convertible top, and affixing means affixing said plastic connecting element to said outer edge section of said glass, said connecting element having a flat part underlying said marginal edge portion of said convertible top, said convertible top having a terminating edge defining said opening, said connecting element having an extending section extending from said flat part, said extending section extending about said terminating edge which defines said opening in said convertible top, whereby said glass is thereby sealingly secured to said convertible top.

7. The combination according to claim 6 wherein said marginal edge portion of said opening has an outer surface, said extending section contacting said outer surface.

8. The combination according to claim 6 wherein said connecting element has a projection contacting said glass.

9. The combination according to claim 6 wherein said extending section is an arcuate section.

10. The combination comprising a folding convertible top for a vehicle, said folding convertible top having an opening defined by a marginal edge portion, a window pane of solid glass disposed in said opening, said glass having an outer edge section, a plastic connecting element extending between said marginal edge portion of said convertible top and said outer edge section of said glass, securing means securing said plastic connecting element to said marginal edge portion of said convertible top, and affixing means affixing said plastic connecting element to said outer edge section of said glass, said connecting element having a flat part underlying said marginal edge portion of said convertible top, said flat part overlying said outer edge section of said glass, said affixing means being disposed between said outer edge section of said glass and said flat part of said connecting element, said convertible top having a terminating edge defining said opening, said connecting element having an arcuate section extending from said flat part, said arcuate section extending about said terminating edge which defines said opening in said convertible top, whereby said glass is thereby sealingly secured to said convertible top.

11. The combination according to claim 12 wherein said securing means is disposed between said marginal edge portion of said convertible top and said flat part of said connecting element.

12. The combination according to claim 11 wherein said securing means overlies said affixing means.

13. The combination according to claim 12 wherein said marginal edge portion of said convertible top overlies said outer edge section of glass.

14. The combination according to claim 10 wherein said arcuate section has a terminating edge which engages said marginal edge portion of said convertible top.

15. The combination comprising a folding convertible top for a vehicle, said folding convertible top having an opening defined by a marginal edge portion, a window pane of solid glass disposed in said opening, said glass having an outer edge section, a plastic connecting element extending between said marginal edge portion of said convertible top and said outer edge section of said glass, securing means securing said plastic connecting element to said marginal edge portion of said convertible top, affixing means affixing said plastic connecting element to said outer edge section of said glass, said connecting element having a flat part underlying said marginal edge portion of said convertible top, said flat part overlying said outer edge section of said glass, said affixing means being disposed between said outer edge section of said glass and said flat part of said connecting element, said affixing means having a thickness, said connecting element being spaced from said glass a distance equal to said thickness of said affixing means, said connecting element having an extension extending from said flat part to said outer end section of said glass, said extension having a terminating end engaging said outer end section of said glass, whereby said glass is thereby sealingly secured to said convertible top.

16. The combination according to claim 15 wherein said extension is a general flat extension which extends at an obtuse angle relative to said flat part of said connecting element.

* * * * *